United States Patent [19]

Larkins et al.

[11] Patent Number: 4,878,677

[45] Date of Patent: Nov. 7, 1989

[54] SHUT OFF SEAL ABOUT A SHAFT OF A DEVICE HAVING A SIDE ENTRY INTO A TANK

[75] Inventors: David J. Larkins, Brampton; John C. Schneider, Acton, both of Canada

[73] Assignee: Hydrochem Developments Ltd., Brampton, Canada

[21] Appl. No.: 284,556

[22] Filed: Dec. 15, 1988

[51] Int. Cl.[4] .............................................. F16J 15/00
[52] U.S. Cl. ......................................... 277/105; 277/9; 277/59; 277/64; 277/104; 277/123; 366/331
[58] Field of Search ................... 277/9, 9.5, 59, 64, 277/102, 104, 105, 106, 110, 112, 123, 124; 366/285, 286, 331

[56] References Cited

U.S. PATENT DOCUMENTS

| | | | |
|---|---|---|---|
| 2,390,602 | 12/1945 | Maier | 277/64 |
| 4,106,778 | 8/1978 | Cormack et al. | 277/9.5 |
| 4,419,015 | 12/1983 | Liddiard | 277/102 |
| 4,511,255 | 4/1985 | Saucier | 366/286 |
| 4,556,222 | 12/1985 | Lewis et al. | 277/9 |
| 4,765,631 | 8/1988 | Köhnen et al. | 277/106 |

Primary Examiner—William A. Cuchlinski, Jr.
Assistant Examiner—Jeffrey Hohenshell
Attorney, Agent, or Firm—Ridout & Maybee

[57] ABSTRACT

A shut off seal in a device having a rotatable shaft extending through a nozzle side entry structure of a tank is provided by means of a slidable stuffing box housing which can be moved by jack screws into engagement with a sealing collar fastened to the shaft inboard of the housing. The arrangement enables the changing of the packing about the shaft without draining the tank.

9 Claims, 2 Drawing Sheets

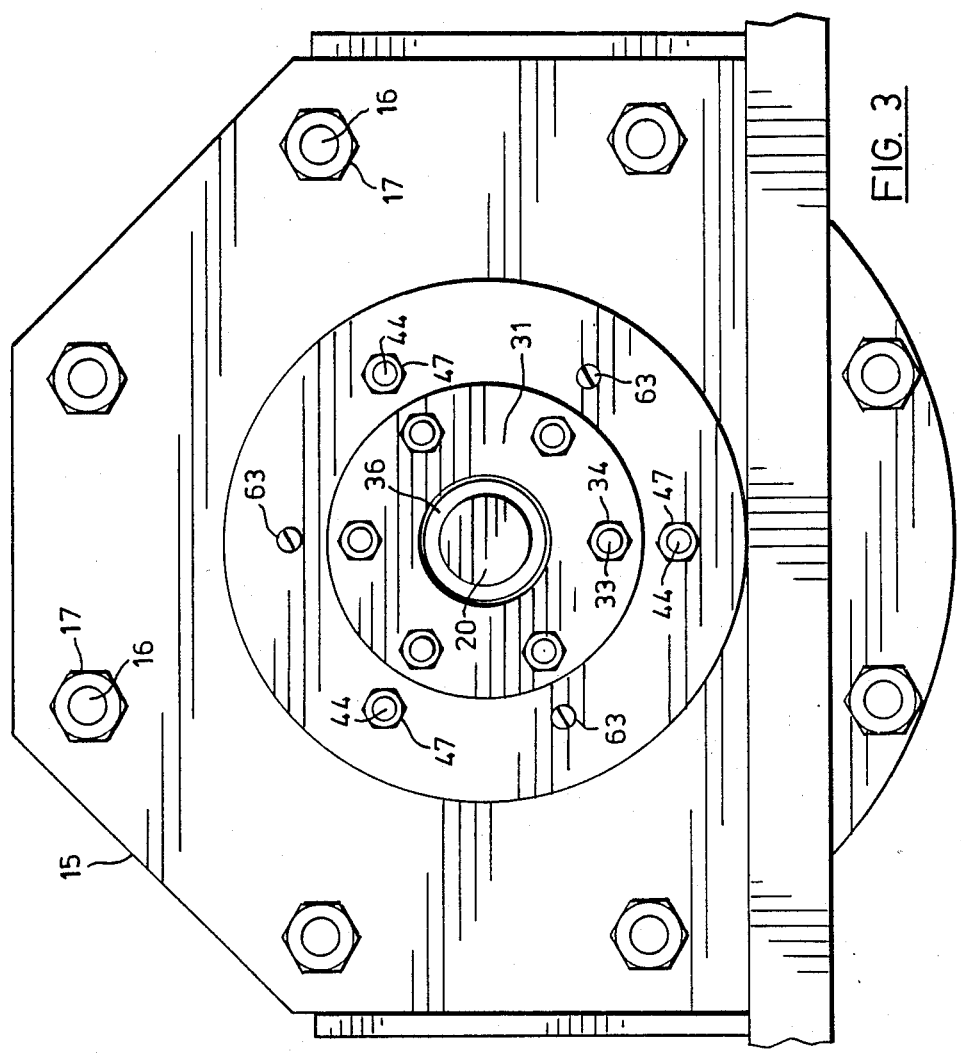

SHUT OFF SEAL ABOUT A SHAFT OF A DEVICE HAVING A SIDE ENTRY INTO A TANK

The invention is a shut off seal in a device having a rotatable shaft extending through a nozzle side entry structure of a tank. The shut off seal enables the packing about the shaft to be changed without draining the tank.

The invention has general application to any rotatable shaft of an apparatus which extends through a side entry structure into a tank containing liquid. Such rotating shafts are equipped with a lubricating sealant packing within a stuffing box housing about the shaft at the entry to the tank. When the packing is no longer functioning as intended, it must be replaced. Previously, the replacement of worn packing necessitated draining the tank, since removal of the packing breaks the seal about the shaft at the entry to the tank. The present invention provides a means for sealing the tank entry about the shaft so that the packing can be changed without draining the tank.

The invention has particular application to side entry agitators for large mixing tanks, but as the skilled person will appreciate, the invention is of general applicability to a variety of devices having rotating shafts entering a tank through an entry structure which is below the liquid level of the tank. The invention allows the user to maximize the utilization of the equipment provided with the shut off seal, since the down time of the equipment for changing of the packing about the shaft is greatly reduced when compared to conventional devices which require drainage of the tank.

Accordingly, the present invention provides a shut off seal in a device having a rotatable shaft extending through a nozzle side entry structure of a tank. The device comprises a mounting flange attachable to the nozzle structure and a housing about the shaft having a flanged end portion which is releasably attachable to the mounting flange. The flanged end portion of the housing is sized to enable it to enter the nozzle structure. The flanged end portion has a flat outer surface. Packing is provided about the shaft within the housing to seal the shaft and lubricate it when it is rotating. A collar having a sealing ring at one end thereof is attached to the shaft with the sealing ring facing the flat outer surface of the flanged end portion of the housing. The collar is spaced slightly from the housing when the housing is attached to the mounting flange. Means are provided to slide the housing which has been detached from the mounting flange into engagement with the collar so that the sealing ring and the flat outer surface of the flanged end portion of the housing form a seal about the stationary shaft.

BRIEF DESCRIPTION OF THE DRAWINGS

FIG. 3 is a plan view from the outboard end of the device showing the mounting flange and housing arrangement about the shaft.

A preferred embodiment of the invention will be described in relation to the drawings which were made for a side entry agitator. As seen in FIG. 1, a tank 10 has a side entry nozzle 12 which is provided with a circumferential end flange 13. The device having the shut off seal comprises a mounting flange 15 which can be attached to the end flange 13 of the nozzle 12 by, for example, bolts 16 and nuts 17.

Figure 2:
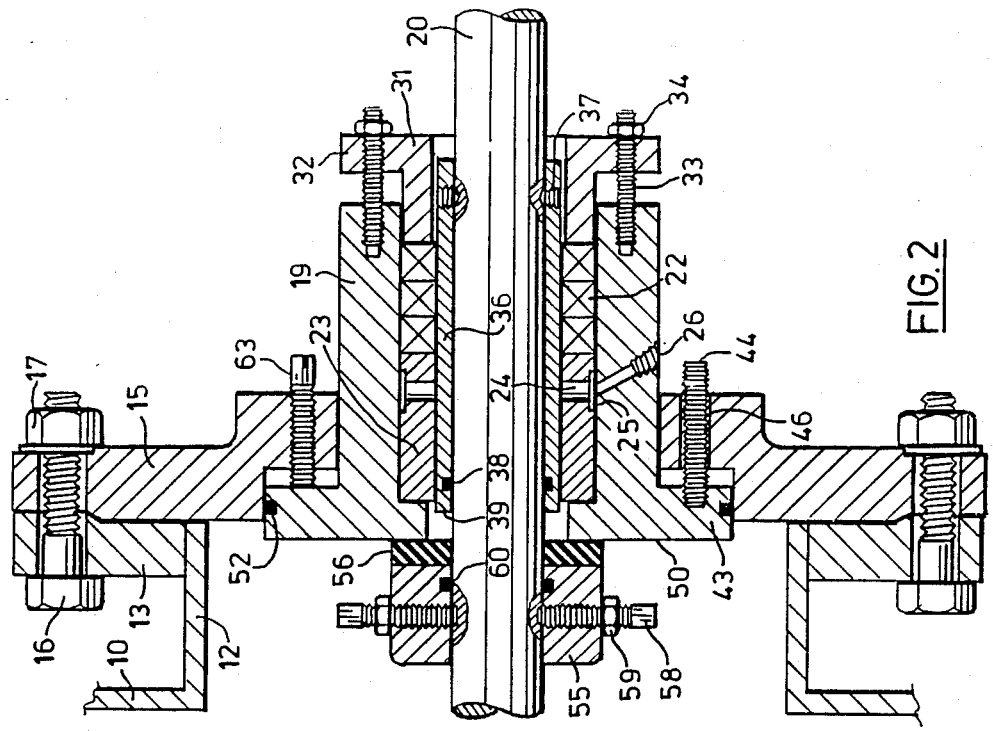
FIG. 2 is the same view as FIG. 1 showing the device with the shut off seal operating to seal the stationary shaft.

A stuffing box housing 19 is provided about the shaft 20 of the agitator or other device. The housing 19 defines an annular space about the shaft 20 for sealant packing rings 22 and preferably at least one throttle bushing 23. As the skilled person will appreciate, water cooling and lubrication of the throttle bushing 23 and stuffing box may be provided. In this regard, the bushing 23 is provided with a plurality of radial holes 24 and an outer circumferential groove 25 from which the holes 24 extend. An inlet 26 is provided through the housing 19 to the circumferential groove 25 and water is introduced under pressure through the inlet 26, the groove 25 and the holes 24 to provide a thin film of liquid about the bushing 23. The pressurized water applied in this fashion flows out of the housing 19 into the tank 10 thereby preventing the encroachment of liquid from the tank 10 into the housing 19. The water pressure applied through the inlet 26 should not normally be so great as to cause water to flow past the packing rings 22.

The packing rings 22 and bushing 23 are held in the housing by a gland follower 31 which has a flanged end 32 with holes for receiving threaded studs 33 extending from the outboard end of the housing 19. Nuts 34 are used to secure the gland follower 31 against the packing and provide sufficient compression of the packing to create a seal about the shaft 20.

In order to protect the shaft 20 from wear at the packing interface, the shaft 20 is preferably provided with a sleeve 36 which is secured to the shaft 20 preferably with set screws 37. The sleeve 36 is sealed about the shaft by means of an O-ring 38 located near the inboard end 39 of the sleeve 36.

The housing 19 has a flanged end 43 which is releasably attachable to the mounting flange 15 preferably by means of threaded studs 44 in the flanged end 43 which pass through holes 46 in the mounting flange 15. Nuts 47 may be used to attach the housing 19 to the mounting flange 15 or to release the housing 19 therefrom. The flanged end 43 has a flat outer surface 50, and a seal is provided between the housing 19 and the mounting flange 15, for example, by means of an O-ring 52.

A collar 55 having a sealing ring 56 at one end thereof is attached about the shaft 20 with the sealing ring 56 facing the flat outer surface 50 of the flanged end 43 of the housing 19. The collar 55 is attached about the shaft 20 preferably by means of set screws 58 having locknuts 59. The sealing ring 56 may be any of a number of suitable materials such as glass filled TEFLON®, as will be apparent to the person skilled in the art. The collar 55 is sealed about the shaft 20 by means of an O-ring 60.

Figure 1:
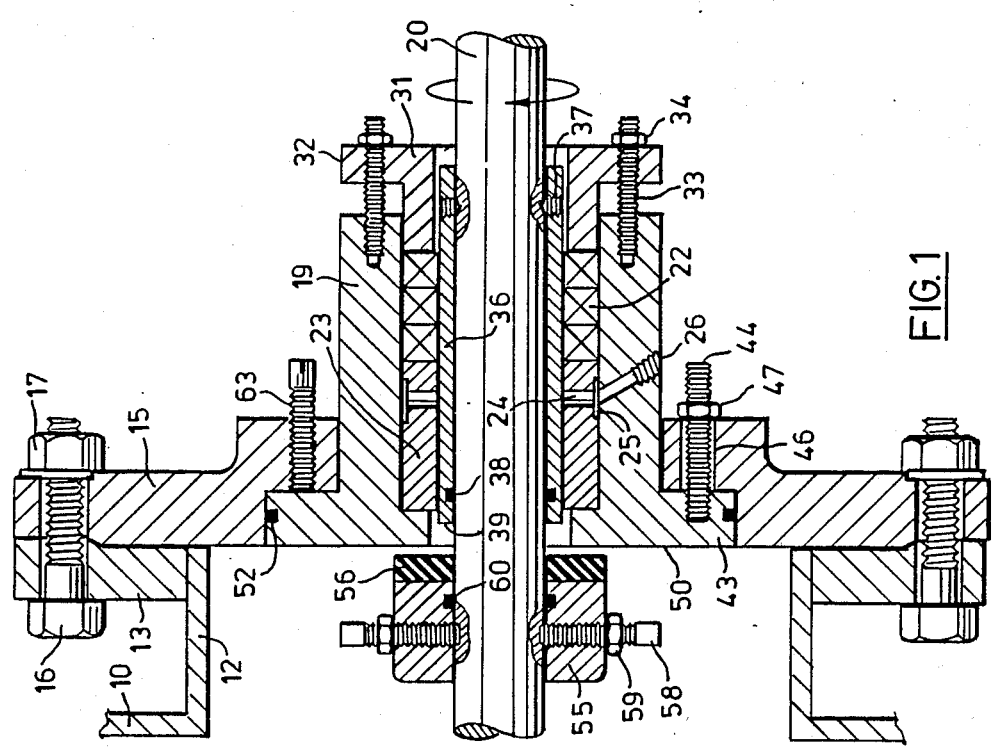
FIG. 1 is a cross sectional side elevation of a device according to the invention when in the normal operating condition.

The operating configuration is illustrated in FIG. 1 where the housing 19 is attached to the mounting flange 15 by the studs 44 and nuts 47, and the collar 55 is spaced slightly from the flat outer surface 50 of the flanged housing end 43. This spacing of the collar 55 from the flanged housing end 43 need only be about 2 mm; just so that free rotation of the shaft 20 is assured.

When the packing is to be changed, the rotation of the shaft 20 is stopped, and the nuts 47 are backed off on studs 44 or simply removed, thereby releasing the housing 19 from the mounting flange 15. Jack screws 63 are provided through threaded holes in the mounting flange 15 and engage the flanged end 43 of the housing 19.

Using the jack screws 63, the housing 19 is forced against the sealing ring 56 of the collar 55 thereby providing a shut off seal about the shaft 20 at the inboard end of the housing 19. The seal between the housing 19 and the mounting flange 15 is maintained by the O-ring 52. This arrangement, as shown in FIG. 2, enables the removal of the gland follower 31, the packing rings 22 and throttle bushing 23 as well as the sleeve 36 about the shaft 20, so that all or some of these components can be replaced. The shut off seal enables the user to change the packing and the sleeve 36 without draining the tank 10.

Upon reassembly of the packing in the housing 19 and reattachment of the gland follower 31, the jack screws 63 are retracted and the housing 19 is secured to the mounting flange 15 with the nuts 47 as shown in Fig. 1.

We claim:

1. A shut off seal in a device having a rotatable shaft extending through a nozzle side entry structure of a tank, comprising:

a mounting flange attachable to the nozzle structure;
    a housing about the shaft, the housing having a flanged end which is releasably attachable to the mounting flange and which is sized to enable it to enter the nozzle structure, said flanged end having a flat outer surface;
    releasable attachment means for attaching the flange of the housing to the mounting flange;
    sealing means between the mounting flange and the housing;
    packing about the shaft within the housing, the packing providing a seal about the shaft and lubricating the shaft when it is rotating;
    a collar having a sealing ring at one end thereof, the collar being attached to the shaft with the sealing ring facing the flat outer surface of the flanged end of the housing, the collar being spaced slightly from the housing when the housing is attached to the mounting flange; and
    means for sliding the housing into engagement with the sealing ring of the collar so that the sealing ring and the flat outer surface of the flanged end of the housing form a seal about the stationary shaft while also maintaining the seal between the mounting flange and the housing.

2. A shut off seal as claimed in claim 1, wherein the housing is attached to the mounting flange by means of threaded studs and nuts.

3. A shut off seal as claimed in claim 1, wherein the sealing means between the mounting flange and the housing is an O-ring.

4. A shut off seal as claimed in claim 1, wherein the packing comprises a throttle bushing and a plurality of packing rings.

5. A shut off seal as claimed in claim 1, wherein the packing comprises a throttle bushing having an outer circumferential groove from which extend a plurality of radial holes through the bushing, the housing having an inlet therethrough opening to the circumferential groove of the bushing so that pressurized water can be introduced through the inlet to provide cooling and lubrication about the bushing.

6. A shut off seal as claimed in claim 1, wherein the sealing ring at one end of the collar is spaced about 2 mm from the flat outer surface of the flanged end of the housing when the housing is attached to the mounting flange.

7. A shut off seal as claimed in claim 1, wherein the means for sliding the housing into engagement with the sealing ring of the collar are a plurality of jack screws threaded through the mounting flange which are engageable with the flanged end of the housing.

8. A shut off seal as claimed in claim further comprising a sleeve about the shaft portion within the housing so that the packing engages the outer surface of the sleeve rather than the shaft.

9. A shut off seal as claimed in claim 8, wherein the sleeve is attached to the shaft by means of a plurality of set screws and the sleeve is sealed about the shaft by means of an O-ring.

* * * * *